United States Patent
Eisinger et al.

(10) Patent No.: US 6,741,690 B2
(45) Date of Patent: May 25, 2004

(54) NETWORK SERVER

(75) Inventors: Bernd Eisinger, Stockern (AT); Harald Mairboeck, Vienna (AT); Thomas Schweeger, Vienna (AT)

(73) Assignee: Alcatel, Paris (FR)

( * ) Notice: Subject to any disclaimer, the term of this patent is extended or adjusted under 35 U.S.C. 154(b) by 462 days.

(21) Appl. No.: 09/837,365

(22) Filed: Apr. 19, 2001

(65) Prior Publication Data

US 2002/0001376 A1 Jan. 3, 2002

(30) Foreign Application Priority Data

Apr. 20, 2000 (DE) ........................... 100 19 727

(51) Int. Cl.⁷ .................. H04M 3/42; H04M 7/00; G06F 17/30
(52) U.S. Cl. .............. 379/201.12; 379/221.08; 379/901; 707/2; 707/3
(58) Field of Search .............. 379/201.01, 201.02, 379/201.12, 219, 221.08, 221.09, 901; 707/1, 2, 3, 100

(56) References Cited

U.S. PATENT DOCUMENTS

| 5,345,502 A | 9/1994 | Rothenhofer | .......... 379/221.09 |
| 5,490,212 A | * 2/1996 | Lautenschlager | .......... 379/225 |
| 5,748,710 A | 5/1998 | Lautenschlager | |

FOREIGN PATENT DOCUMENTS

| DE | 43 29 172 A1 | 3/1995 | ............ H04M/3/42 |
| DE | 199 01 146 A1 | 7/2000 | ............ G08C/17/02 |
| DE | 199 32 974 A1 | 2/2001 | ............ H04Q/7/24 |
| GB | 2341759 A | 3/2000 | |
| WO | WO 9722209 | 6/1997 | |

OTHER PUBLICATIONS

ISDN im Buro—HICOM—Siemens AG, Munich, 1985, ISBM 3–8009–3846–4.
Bedienungsanleitung NOKIA 6150 (Nokia 6150 Opeating Instructions) 9351611, Issue 3, 1998, Nokia Mobile Phone.
Wireless Application Protocol Architecture Specification—Version 30—WAP Architecture—Apr. 1998.

* cited by examiner

Primary Examiner—Harry S. Hong
(74) Attorney, Agent, or Firm—Sughrue Mion, PLLC

(57) ABSTRACT

A network server for the provision of services in a telephone network has a database for storing data according to subscriber-specific hierarchical data structures. The network server allows subscribers of the telephone network, via a terminal, to specify a respective subscriber-specific hierarchical data structure in the database. The network server stores data in the database received by a terminal of a subscriber, in accordance with the respective subscriber-specific hierarchical data structure of this subscriber. On a data request by a terminal of the telephone network, the network server determines the subscriber of the terminal, allows the terminal to read out the data in the database stored in accordance with the subscriber-specific hierarchical data structure of the detected subscriber.

10 Claims, 2 Drawing Sheets

NETWORK SERVER

BACKGROUND OF THE INVENTION

The invention concerns a network server for the provision of services in a telephone network, wherein the network server is provided with a first communications unit for communication with elements of the telephone network.

The invention is based on the provision of services within a telephone network by means of the IN (intelligent network) architecture. The provision of such a service by a network server having a database is described in U.S. Pat. No. 5,345,502.

Mobile radio terminals are interconnected via a telephone network that has switching centers, which provide the function of service switching centers of an IN architecture. On the basis of a service identification entered in a call request, these switching centers initiate the setting-up of a data circuit to a network server, which provides the function of a service control unit in the IN architecture. The network server can initiate the rerouting of communications circuits through the telephone network by sending control commands, among other things.

In order to establish a telephone circuit between two mobile radio terminals through the telephone network, the telephone number dailed by the subscriber of the calling mobile radio terminal is transmitted to the network server via the data circuit. By means of a database, the network server then determines the location of the subscriber to which this telephone number is allocated, and then determines routing information assigned to this location. The routing information determined in this way is sent back via the data circuit to the calling mobile radio terminal, which then establishes a telephone circuit to the called mobile radio terminal by means of this routing information.

SUMMARY OF THE INVENTION

The object of the invention is now to enable the provision of further more complex services by a network server.

In this connection, the invention is based on the idea of offering by means of the network server a personal network service that provides a user with a first access interface via which, preferably by means of an IP (Internet protocol) terminal, he can create a personal, hierarchically structured database having a personal, hierarchical data structure in the network server, and provides a second access interface via which the user can read data from his personal database by means of a telephone terminal.

The advantage of the invention is that it enables a large number of new, content-related services to be realized in a telephone network. Furthermore, this further improves the user friendliness of the telephone network and the added value being offered to the telephone network subscribers.

BRIEF DESCRIPTION OF THE DRAWINGS

The invention is explained below by means of several exemplary embodiments and with the aid of the accompanying drawings, of which.

DETAILED DESCRIPTION OF THE INVENTION

Figure 1:
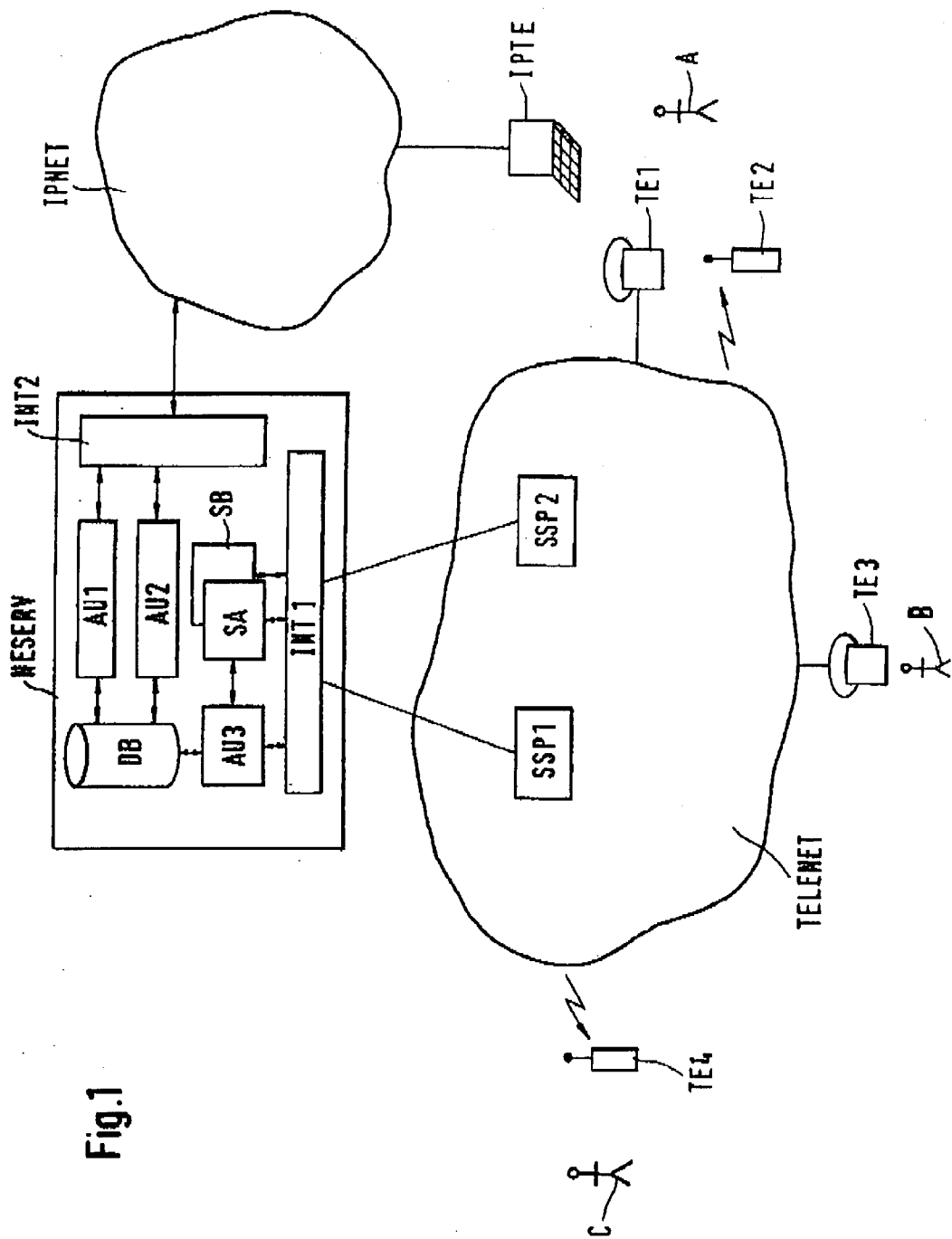
FIG. 1 shows a functional representation of a communication system with a network server according to the invention for a first exemplary embodiment.

FIG. 1 shows two communications networks TELENET and IPNET, a network server NESERV, five terminals TE1, TE2, TE3, TE4, IPTE, and three subscribers A, B, C of the communication network TELENET. Terminals TE1, TE2 and IPTE are assigned to subscriber A, terminal TE3 to subscriber B and terminal TE4 to subscriber C. The number of terminals and subscribers, as well as their allocation, is chosen as an example.

The communication network TELENET is a telephone network. It enables communication between terminals TE1 to TE4. Here the communication network TELENET is formed by a mobile radio network, for example a cellular mobile radio network conforming to the GSM (Global System Mobile Communication) standard and a fixed network, for example an ISDN (Integrated Services Digital Network) telephone network. It is also possible for the communication network TELENET to include one or more further telephone networks (mobile radio networks or fixed networks) or a data network (for example for voice over IP), which can be assigned to different network operators.

The communication network TELENET has several specially configured switching centres which provide a service switching function in accordance with an IN (Intelligent Network) architecture. Of these switching centres, by way of example FIG. 1 shows two service switching centres SSP1 and SSP2.

The communication network IPNET is an IP network, that is to say a data network that uses the IP (Internet Protocol) protocol as a layer 3 communication protocol. The terminal IPTE is a terminal that is equipped with the necessary communication components for communication via the communication network IPNET. For example the terminal IPTE is a computer with a WEB browser and equipped with a modem or a network card.

The network server NESERV makes network services available within the communication network TELENET.

The network server NESERV is formed by one or more computers linked via a communications medium on which reside an SW system platform, comprising for example an operating system and a database system, plus application programs. When running on the system platform of the network server NESERV, these application programs control the functions of the network server NESERV and therefore control the provision of the functions of the network server NESERV, which are described below.

From a functional point of view, the network server has a database DB, two communications units INT1 and INT2, three access units AU1 to AU3 and two service logic units SA and SB.

The communications unit INT1 is used for communication with elements of the communication network TELENET, for example for communication with service switching centers or terminals of the communication network TELENET.

Here they provide the necessary communications mechanisms for communication with the service switching centers SSP1 and SSP2. The protocol stack for this, which is handled by the communications unit INT1, consists of No. 7 protocols that are used as transport protocols and an INAP (Intelligent Network Application Protocol) protocol placed above this. It is also possible to use other transport protocols, for example an ETHERNET protocol or another LAN (Local Area Network) protocol, on which lies an IP protocol.

INAP protocols specially adapted to mobile radio networks can also be employed. Furthermore, it is also possible for the communications unit INT1 to communicate via this protocol stack with service support systems (intelligent peripherals), for example to activate voice output at a terminal of the communication network TELENET.

Within the IN architecture the network server NESERV provides a service control function, thus representing a service control unit of the communication network TELENET. The functions required for service control function/service switching function communication are provided by the communications unit INT1.

The communications unit INT2 provides the necessary communications mechanisms for communication via the communication network IPNET. The protocol stack for this communication consists, for example, of a LAN (Local Area Network) protocol or ATM (Asynchronous Transfer Mode) protocol which supports a TCP/IP (Transmission Control Protocol/Internet Protocol).

The database DB is used for storing data in accordance with various subscriber-specific hierarchical data structures. The database DB therefore has for example a number of data records each of which is assigned to another subscriber of the communication network. Each of these data records has its own subscriber-specific hierarchical data structure. The data of the respective data record are stored in the database according to this data structure.

The access unit AU1 allows subscribers of the communication network TELENET, by means of a terminal, to specify a respective subscriber-specific hierarchical data structure in the database DB.

Access to the access unit AU1 is preferably obtained via the communications unit INT2, for example by means of the terminal IPTE. The access unit AU1 therefore allows IP terminals, via the communications unit INT2, to specify subscriber-specific hierarchical data structures in the database DB. For this, the access unit AU1 provides subscribers with a WEB interface as the user interface. Subscribers can thus communicate with the access unit AU1 by means of an IP terminal that is equipped with a WEB browser.

However, access to the access unit AU1 can also be obtained by means of a terminal that supports the WAP (Wireless Application Protocol) if the access unit AU1 makes a suitable user interface available. Instead of such a WEB-based user interface or in addition to this type of user interface, it is also possible for the access unit AU1 to provide an IN service which, by means of a normal terminal, preferably a mobile radio terminal, makes it possible to communicate with the access unit AU1 in order to establish subscriber-specific hierarchical data structures in the database DB. In this case access to the access unit AU1 would be effected via the communications unit INT1.

At the request of a terminal wishing to access the functions of the access unit AU1, the access unit AU1 first determines this terminal's subscriber. This can be achieved, for example, by the access unit AU1 requesting the terminal to transmit a subscriber-specific or terminal-specific identification to the access unit AU1. An identification can for example consist of a telephone number assigned to the subscriber or the name of the subscriber. It is also possible for the access unit to evaluate an identification that is sent automatically with the request.

Furthermore, it is advantageous that the access unit AU1 carries out a subscriber authorization, for example by requesting the terminal to send a code word assigned to the identification or encrypt a random number with a subscriber-specific or terminal-specific key.

It is furthermore advantageous that after determining the subscriber, the access unit AU1 checks the detected subscriber is stored in a list in which authorization subscribers of the communication network TELENET are stored for utilization by network server NESERV. The list contains, for example, those subscribers of the communication network TELENET that have subscribed to the service described here and provided by the network server NESERV in the communication network TELENET. The access unit AU1 then allows access to the database DB only when the detected subscriber is stored in this list.

After determining the subscriber, the access unit AU1 locates the subscriber-specific, hierarchical data structure of the detected subscriber within the database DB and allows the terminal to read out and modify the subscriber-specific hierarchical data structure of the detected subscriber stored in the database DB. In this case it first locates the data record that is assigned in the database to the detected subscriber and then allows the terminal to read out and modify the data structure of this data record. For this, by appropriate control commands via the terminal, it allows the subscriber for example to create new layers in the respective subscriber-specific, hierarchical data structure in the database DB and/or create new components in the respective subscriber-specific hierarchical data structure in the database DB. In this case the input and modification of the data structure can also be achieved via a graphical user interface by "graphical programming".

It is further advantageous if a basic data structure is already established for the respective subscriber, which can be simply adapted to the respective subscriber's requirements: for example, a data structure with three layers can be predefined, which the subscriber modifies so that he generates new components in these layers. For the generation of a new component, he defines, for example, whether the respective component is further structured, or whether it, as the lowest structure, represents for example a data element with text content.

Furthermore, it is advantageous if, by transmitting control commands, the user interface provided by the access unit AU1 allows the terminal to add text to the respective components,
  to define telephone numbers for "click to dial", or
  to predefine start points for a (WAP) search within any layer of the data structure. This enables a fast search function to be simply realized.

The access unit AU2 is used to store the data received by a subscriber's terminal in the database DB according to the respective subscriber-specific hierarchical data structure of this subscriber.

Here communication between subscribers' terminals of the communication network TELENET and the access unit AU2 takes place in the same way as communication between these terminals and the access unit AU1 in FIG. 1. On a request from a terminal wishing to have access to the functions of the access unit AU2, the access unit AU2 first determines the subscriber of this terminal and then locates the data record that is assigned to this subscriber within the database DB. This can be effected in the same way as in the access unit AU1 in FIG. 1. It then provides the terminal with a user interface for inputting and modifying data of this data record within the subscriber-specific hierarchical data structure of this data record. In this case data are stored in the database DB or erased in accordance with the control commands entered via this user interface.

In this connection, it is advantageous to offer the functions of the access unit AU2 under the same user interface as those of the access unit AU1. In this case it is advantageous to realize the access units AU1 and AU2 as parts of the same SW component.

At the request of a terminal of the communication network TELENET, the access unit AU3 determines the subscriber of this terminal. This can be effected in the same way as in the determination of the subscriber by the access unit AU1. The access unit AU3 then allows the terminal to read out the data in the database DB stored in accordance with the subscriber-specific hierarchical data structure of the detected subscriber. The data read out in this way are sent to elements of the communication network TELENET by the access unit AU3 by means of the first communications unit INT1. For example, the data read out can be transmitted to the service switching centers SSP1 and SSP2 as a part of the control command.

During the provision of these functions, the terminal communicates with the access unit AU3 via the communications unit INT1. The access unit AU3 therefore provides an IN service which allows access to the database DB via the access unit AU3 and, via the normal terminal, preferably a mobile radio terminal, allows data to be read out of the database DB.

It is also possible for the access unit AU3 to offer other network server NESERV IN service logic units offered by the access unit's service, for example the service logic units SA and SB, or triggers such service logic units when carrying out its function. This makes it possible to realize a number of different services with a very efficient utilization of the SW components.

Figure 2:
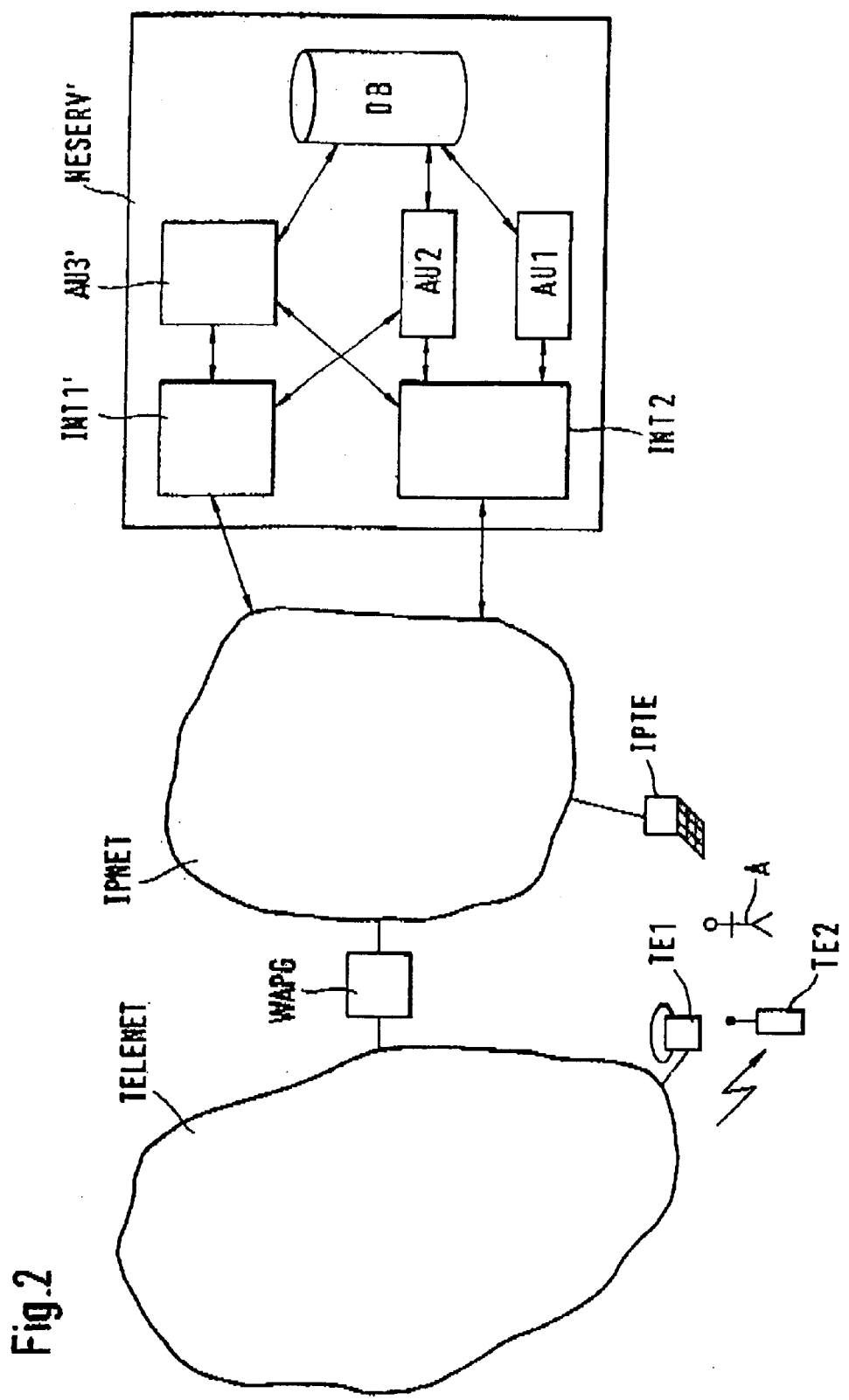
FIG. 2 shows a functional representation of a communication system with a network server according to the invention for a second exemplary embodiment.

The construction of a network server is now explained in a further exemplary embodiment with the aid of FIG. 2.

FIG. 2 shows the communication networks TELENET and IPNET, as well as a network server NESERV' and the terminals TE1, TE2 and IPTE assigned to the subscriber A.

The communication networks TELENET and IPNET are configured like the communication networks TELENET and IPNET as shown in FIG. 1. They are interconnected via a WAP gateway WAPG. Here the WAP gateway WAPG carries out a translation of "normal" Internet documents into documents conforming to the WAP standard.

The network server NESERV' is an Internet server that provides services in the communication network TELENET by means of the WAP protocol. The mobile radio terminal TE2 is equipped with an additional functionality which enables it to communicate with the network server NESERV' by means of the WAP protocol via the WAP gateway WAPG. In this case, by suitable configuration of the network server NESERV', it is also possible to dispense with the WAP gateway WAPG.

With the exception of differences which are described below, the network server NESERV' is constructed like the network server NESERV shown in FIG. 1.

From a functional point of view, the network server NESERV' has a communications unit INT1' and an access unit AU3', as well as the access units AU1 and AU2, the database DB and the communications unit INT2, which are configured as in FIG. 1.

The communications unit INT1' has the necessary functional units for communication via the communications network IPNET. Moreover, it controls the dialogue with the mobile radio terminal TE2 and provides the necessary communications functions for the provision of a WAP-based service within the communications network TELENET. Depending on the equipment level of the communications unit INT1', it is possible in this case to dispense with the WAP gateway WAPG. With suitable configuration of the communications unit INT1' it is thus possible, for example, to connect the network server NESERV' directly to the communications network TELENET.

Either a special client with a special user interface for communication with the access unit AU3' is pre-installed in the mobile radio terminal TE2, or the mobile radio terminal TE2 has a browser to which a suitable input page for inputting data queries can be downloaded from the network server NESERV'. An interactive dialogue with the access unit AU3' can also be enabled via a user interface configured in this way.

The access unit AU3' is configured like the access unit AU3 shown in FIG. 1, with the difference that communication with terminals of subscribers of the communications network TELENET is realized not by means of IN mechanisms, but by means of WAP-based communication as described above. Accordingly, the access unit AU3' offers terminals of the communications network TELENET a WAP-based user interface which can be configured as illustrated above.

In this connection, in particular, it is also possible for the data read from the database DB to be linked to the setting-up of telephone calls by means of the "click to call" telephone numbers predefined within the selected components described above. Data access to the database DB and the setting-up of calls through the communications network TELENET can therefore be interlinked in an advantageous way. The control command for setting up the call can be generated directly by the access unit AU3'. The setting-up of calls can also be initiated automatically by the terminal.

What is claimed is:

1. A network server for the provision of services in a telephone network, wherein the network server comprises:

a first communications unit for communication with elements of the telephone network, a database for storing data in accordance with various subscriber-specific hierarchical data structures, a first access unit that allows subscribers of the telephone network, by means of a terminal, to specify a subscriber-specific hierarchical data structure in the database that is assigned to the respective subscriber, a second access unit that stores data received by a terminal of a subscriber in the database in accordance with this subscriber's respective subscriber-specific hierarchical data structure, a third access unit that determines, on a data request by one of the terminals of the telephone network the subscribers of this terminal, allows the terminal to read out the data stored in the database according to the subscriber-specific hierarchical data structure of the detected subscriber and sends the read-out data by means of the first communications unit.

2. The network server according to claim 1, wherein the first access unit determines, on a request from a terminal, the subscriber of this terminal, locates the subscriber-specific hierarchical data structure of the detected subscriber within the database, and allows the terminal to read out and modify the subscriber-specific hierarchical data structure of the detected subscriber stored in the database.

3. The network server according to claim 1, wherein the first access unit determines, on a request from a terminal the subscriber of this terminal, checks whether the detected subscriber is stored in a list in which authorized subscribers of the telephone network are stored for utilization by the network server, and only allows access to the database if the detected subscriber is stored in this list.

4. The network server according to claim 1, wherein the first access unit allows subscribers of the telephone network, by means of a terminal, to create new levels in the respective subscriber-specific hierarchical data structure of the respective subscriber in the database.

5. The network server according to claim 1, wherein the first access unit allows subscribers of the telephone network, by means of a terminal, to create new components in the respective subscriber-specific hierarchical data structure of the respective subscriber in the data base.

6. The network server according to claim 1, wherein the network server further comprises a second communications unit for communication with terminals of an IP network and the first access unit allows IP terminals, via the second communications unit, to specify subscriber-specific hierarchical data structures in the database.

7. The network server according to claim 1, wherein the first communications unit communicates with telephone terminals of the telephone network via service switching centers of the telephone network.

8. The network server according to claim 1, wherein the first communications unit communicates with mobile radio terminals of the telephone network by means of the WAP protocol.

9. The network server according to claim 1, wherein the network server is a service control unit of the telephone network, which provides service in the telephone network.

10. The network server according to claim 1, wherein the network server is an Internet server that provides services in the telephone network by means of the WAP protocol.

* * * * *